United States Patent
Gozzi

(10) Patent No.: US 8,306,644 B2
(45) Date of Patent: Nov. 6, 2012

(54) METHOD AND SYSTEM FOR MODELING A MANUFACTURING PROCESS

(75) Inventor: Andrea Gozzi, Genova (IT)

(73) Assignee: Siemens Aktiengesellschaft, Munich (DE)

( * ) Notice: Subject to any disclaimer, the term of this patent is extended or adjusted under 35 U.S.C. 154(b) by 363 days.

(21) Appl. No.: 12/693,578

(22) Filed: Jan. 26, 2010

(65) Prior Publication Data

US 2010/0191358 A1     Jul. 29, 2010

(30) Foreign Application Priority Data

Jan. 29, 2009  (EP) .................................... 09100085

(51) Int. Cl.
*G06F 19/00* (2011.01)
*G06F 17/50* (2006.01)

(52) U.S. Cl. .......................................... 700/97; 703/13
(58) Field of Classification Search .................... 700/97; 705/7.12, 28; 703/13
See application file for complete search history.

(56) References Cited

U.S. PATENT DOCUMENTS

| | | | |
|---|---|---|---|
| 6,871,113 B1 | 3/2005 | Maxim et al. | |
| 6,993,456 B2 * | 1/2006 | Brooks et al. | 702/183 |
| 7,072,731 B1 * | 7/2006 | Barto et al. | 700/102 |
| 7,177,714 B2 * | 2/2007 | Giebels et al. | 700/99 |
| 7,363,204 B2 * | 4/2008 | Colombo | 703/7 |
| 7,949,501 B1 * | 5/2011 | Iravani | 703/6 |
| 8,126,840 B2 * | 2/2012 | Davis | 707/608 |
| 2002/0128810 A1 * | 9/2002 | Craig et al. | 703/17 |
| 2002/0193972 A1 * | 12/2002 | Kudo et al. | 703/1 |
| 2004/0034555 A1 * | 2/2004 | Dismukes et al. | 705/7 |
| 2005/0171743 A1 * | 8/2005 | Hopf | 703/1 |
| 2006/0015315 A1 * | 1/2006 | Colombo et al. | 703/22 |
| 2006/0149406 A1 | 7/2006 | Chen et al. | |
| 2008/0154660 A1 | 6/2008 | Steinbach et al. | |
| 2009/0069921 A1 * | 3/2009 | Balzer et al. | 700/97 |
| 2010/0131076 A1 * | 5/2010 | Colombo et al. | 700/7 |

* cited by examiner

*Primary Examiner* — Ronald Hartman, Jr.
(74) *Attorney, Agent, or Firm* — Laurence A. Greenberg; Werner H. Stemer; Ralph E. Locher

(57) ABSTRACT

A method and a system model a manufacturing process wherein an manufacturing executing system implements the modeled manufacturing process and plans and/or controls the corresponding manufacturing at the shop floor. The method includes providing a number of real machines at the shop floor and describing each real machine by a real machine module having machine attributes in order to control the execution of the real machine. Within the manufacturing process a specific manufacturing activity is defined that requires the execution of a distinct subset of real machines in order to perform its specific production activity. Virtual equipment is provided by combining the real machines included in the subset and describing the virtual equipment by a virtual equipment model to plan and control the specific production activity. The virtual equipment model contains a planning level model and a controlling level model.

4 Claims, 3 Drawing Sheets

METHOD AND SYSTEM FOR MODELING A MANUFACTURING PROCESS

CROSS-REFERENCE TO RELATED APPLICATION

This application claims the priority, under 35 U.S.C. §119, of European application EP 09 100 085, filed Jan. 29, 2009; the prior application is herewith incorporated by reference in its entirety.

BACKGROUND OF THE INVENTION

Field of the Invention

The present invention relates to a method and a system for modeling a manufacturing process planned by enterprise resource planning (ERP) and produced by a shop floor, wherein a manufacturing executing system (MES) implements a modeled manufacturing process and plans and/or controls the corresponding manufacturing at the shop floor.

As it is well known, a method for managing and controlling manufacturing processes planned by enterprise resource planning (ERP) and produced by a shop floor, provides a manufacturing executing system (MES) for implementing the planned manufacturing processes and controlling the corresponding production steps at the plant floor.

In particular, the enterprise resource planning (ERP) is a system including hardware devices and corresponding software applications for planning the business resources of an enterprise, i.e. material provisions, human resource managements, purchasing, orders, profits, finance, inventory controls, customer managements, etceteras, while the term "plant floor" has been used to indicate a system supporting the control of single machines involved in the manufacturing processes, for example by measuring the number of pieces produced per hour by each machine or the functioning parameters thereof, the quality of the pieces produced and so on.

As schematically represented in FIG. 1, MES is an intermediate layer providing computing machines and software tools 1-$n$ between the ERP upper layer and the plant floor lower layer, including a software tool for production order management 1, which receives requests of production from the ERP, and a software tool for production modeling 2, which supports the phases of selecting and managing the resources to be involved in the manufacturing processes, i.e. employees, machines and materials, in order to realize a planned manufacturing process within required time constrains.

Therefore, manufacturing execution systems require modeling plant equipment for both controlling and planning activities. Despite looking at the same set of machines, controlling and planning activities have different goals and can require different model approaches. However, two separate models for the same set of machines cannot be used in the MES application because this separation will lead to modeling gap.

In order to clarify this situation, the following simple example is considered.

Programmable painting equipment is built up by a number of nozzle machines; each nozzle machine is able to paint a specific color. For instance, four color painting equipment (Cyan, Magenta, Yellow, Black) is considered. Supposing that the paint equipment is able to mix up the basic colors and paint with a large number of derived colors, this situation invokes completely different approaches when comparing planning and controlling strategies.

According to the controlling activities, the MES will benefit best of a separate model for each nozzle machine which means the paint equipment of this example contains four machines. This model can easily manage a set of machine variables and actions that are used by the MES application for controlling the machine execution, e.g. each nozzle machine requires modeling a set of machine attributes that describe for example the level of ink, the cleanness of the nozzle, the execution of a periodic nozzle cleaning procedure, etc. In other words, the controlling activities desire to achieve a high granularity with respect to the machines to be controlled.

Now to the contrary, according to the planning activities the MES model will benefit of a single model for the entire painting equipment. This model can easily manage the set of equipment attributes (different from the machine attributes) that describe the action performed by the painting equipment, e.g. the composed color which is not a basic color of one of the four nozzle machines and the required portions of the basic colors for each nozzle machine, the intensity used for painting, etc.

Therefore, both models focus only on specific aspects of the MES application with offering advantages for the primary aspect but incurring disadvantages for the secondary aspect and vice versa. For instance, by modeling the painting equipment via four separate machines, it is straightforward to control the availability of ink in each nozzle; however, it is not clear how to model the concept of equipment that paints a composed color (i.e. green). By modeling the paint equipment via a single machine, it is straightforward to represent the high level concept of an advanced programmable painter; however, in order to model all the technical requirements of each nozzle machine, a large set of machine attributes must be included within the high level model with absolutely no guarantee of coherence among the various data (e.g. the modeling gap may apply a model asserting that Black is set to 100; Cyan, Magenta and Yellow nozzles are set to 0 while the painting equipment is configured to paint the Green color.

The serious limit of these approaches arises when a set of machines can be organized in different configurations for providing different functionalities as typically applied in flexible manufacturing systems. For instance, the four nozzle machines can be used altogether for performing a single painting phase with a composed color (e.g. Green) and they can be used separately and simultaneously for performing two or more painting phases with basic color (e.g. Yellow and Black). When this manufacturing scenario has to be modeled in a MES application neither the consolidate (single) machine model nor the separate machine model are able to effectively support the in modern production environments required planning and controlling activities.

Unfortunately, available MES software applications provide modeling features that allow the user to represent the plant machines by describing machine attributes and functions. The user is in charge of selecting the best model for fitting his own plant requirements. None of the available MES software applications allow to model a set of machines by different aspects that cover both the desired control and planning activities. When the model requires highlighting different aspects for the same equipment, the user is faced with the problem of partially fitting models and custom applications which implies tremendous efforts in observing a possible modeling gap resulting in fatal production errors or deadlock situations.

SUMMARY OF THE INVENTION

It is therefore an objective of the present invention to provide a system and a method for modeling a manufacturing process planned by enterprise resource planning (ERP) and produced by a shop floor, wherein a manufacturing executing system (MES) implements a modeled manufacturing process and plans and/or controls the corresponding manufacturing at the shop floor offering a sufficiently modeling flexibility in order to satisfy both planning and controlling demands.

The objective is achieved according to the invention by a method for modeling a manufacturing process planned by enterprise resource planning (ERP) and produced by a shop floor, wherein a manufacturing executing system (MES) implements the modeled manufacturing process and plans and/or controls the corresponding manufacturing at shop floor. The method includes the steps of: providing a number of real machines at the shop floor and describing each real machine by a real machine module having machine attributes in order to control the execution of the real machine; defining within the manufacturing process a specific manufacturing activity requiring the execution of a distinct subset of real machines in order to perform its specific production activity; and providing virtual equipment by combining the real machines included in the subset and describing the virtual equipment by a virtual equipment model to plan and control the specific production activity. The virtual equipment model contains a planning level model and a controlling level model.

The method now allows a new modeling approach to realize a flexible manufacturing plant. The new modeling approach describes both the planning and the controlling aspect with a strong relationship among these two representations. The data within the planning level is based on a hierarchical production structure that allows the composition of the virtual equipment by using existing machine modules of existing real and/or virtual machines. The data within the control level describes the virtual equipment with a real hardware oriented approach allowing the user to define the machine attributes as it is exactly required for controlling the machine execution. The creation of the virtual equipment with its composition from already existing real machines and/or other virtual machines and the description of the virtual machine containing specific modeling level and specific controlling level therefore allows to satisfy both the demand for the production modeling and the production controlling.

In a preferred embodiment the method additionally includes the steps of: assigning to the planning level model: a) high-level production attributes of the virtual equipment and b) possible constraints among the high-level production attributes; and assigning to the controlling level the machine attributes of the real machine module.

This means, for example with reference to the example mentioned before, to define high level production attributes for various painting equipment as virtual painters, such as for each nozzle a painter and a separate painter for all composed colors. Therefore, production can be planned with virtual equipment used in parallel as long as the constraints listed in the planning level model are not infringed by the actual planning.

Therefore, in a further preferred embodiment of the present invention, the method includes the steps of: planning the manufacturing process using the planning model level of the virtual equipment model; and controlling the manufacturing process using the controlling level model of the virtual equipment model. This approach allows the combining of both the controlling approach using as much as possible control parameters and the planning approach using as less as possible planning models of the equipment.

Other features which are considered as characteristic for the invention are set forth in the appended claims.

Although the invention is illustrated and described herein as embodied in a method and a system for modeling a manufacturing process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
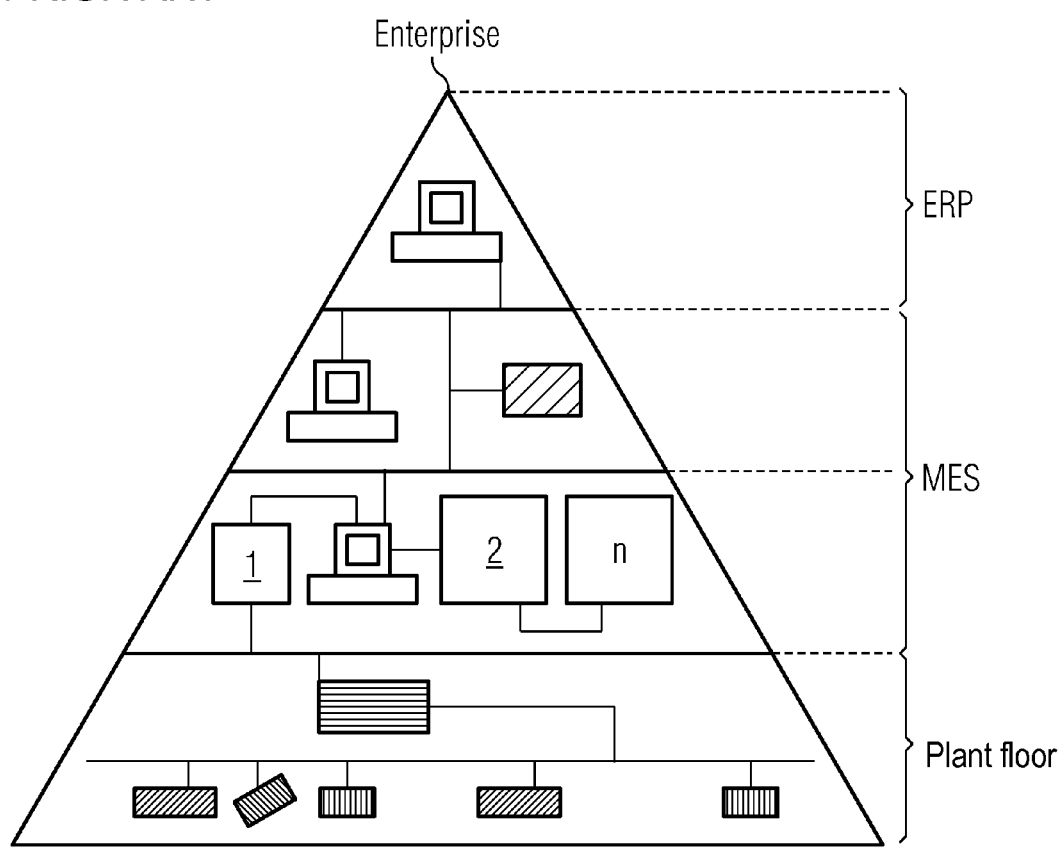
FIG. 1 is a schematic illustration representing a method for managing and controlling manufacturing processes, according to the prior art.
Figure 2:
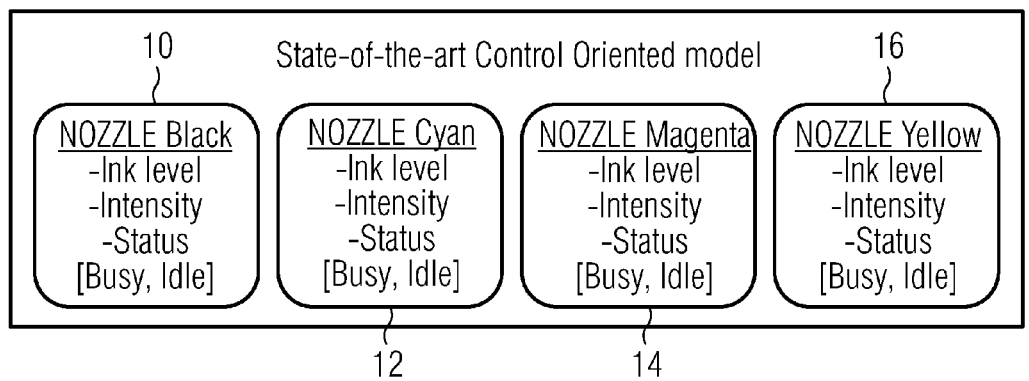
FIG. 2 is a diagram of a control oriented model according to the invention.
Figure 3:
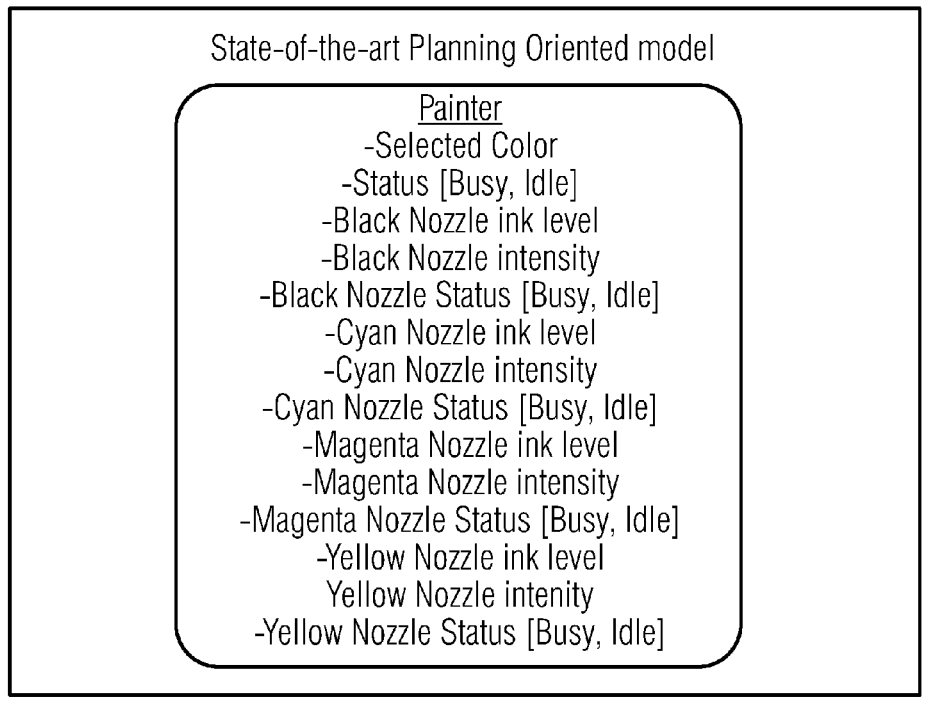
FIG. 3 is a diagram of a planning oriented model according to the invention.

Referring now to the figures of the drawing in detail and first, particularly, to FIG. 2 thereof, there is shown a diagram of a control oriented model according to the invention. Each nozzle machine 10 to 16 can be controlled individually with respect to its significant real machine attributes, such as ink level, intensity, status, and nozzle cleanness. Therefore, by modeling the paint equipment by use of the four separate nozzle machines 10 to 16, these real machine attributes can be easily controlled separately. Currently, this model does not allow too model the concept of equipment that paints a composed color. By modeling the paint equipment via a single machine as depicted in FIG. 3, a high-level concept of an advanced programmable painter is representable. But in order to model actually all the technical requirements of each nozzle machine 10 to 16, a large set of variable must be included in the high-level model with absolutely no guarantee on the coherency among the various data.

The innovative idea is now to provide a new modeling approach to a manufacturing plant that allows too describe both the control and the planning aspects with a strong relationship between the two representations.

Figure 4:
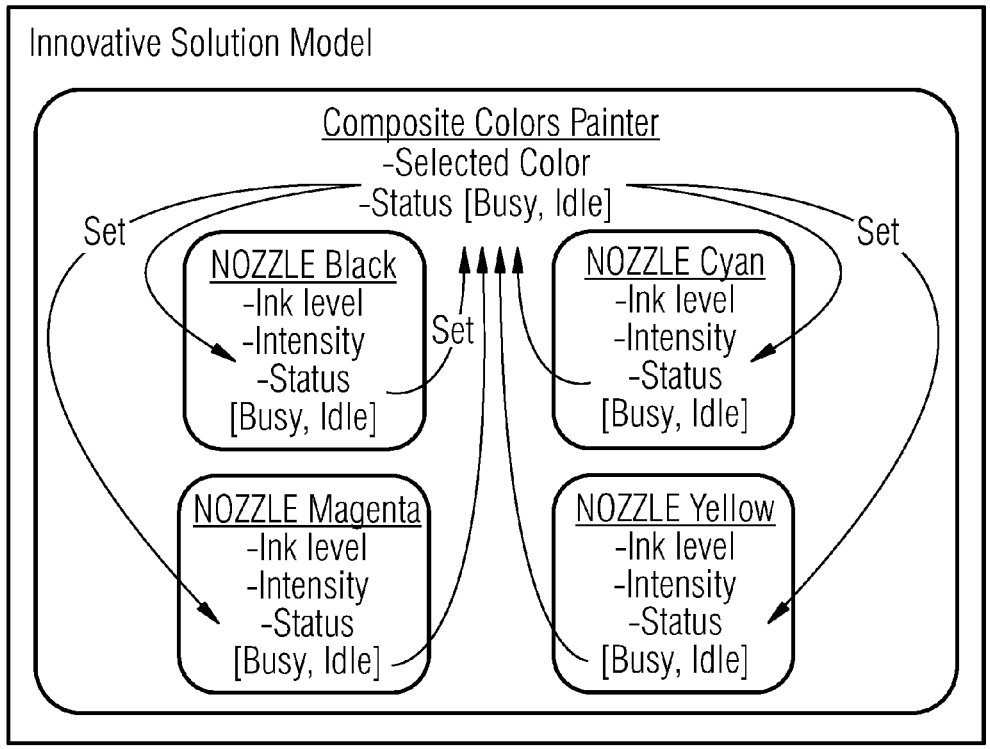
FIG. 4 is a diagram of a innovative solution model for a composite color painter.

The modeling approach is based on a hierarchical structure that allows composing equipment models for the painter by using other equipment model modules, i.e. for the single nozzles or for every possible combination among these nozzle machines 10 to 16. The control level model describes the equipment with a real hardware oriented approach. Therefore, the user is able to define the machine attributes as it is exactly required for controlling the machine execution. In other words, the planning does not need to observe any of the real machine attributes except for possible constraints when using the same nozzle machine in two planning activities simultaneously. In the example given above, the user can model the four different nozzle machines (10 to 16) with their attributes only focusing on the control aspect (e.g. the level of ink, and the cleanness status of the nozzle). In order to cover the planning aspect of the MES application, the user can now model virtual equipment that represents the high-level painting equipment. In this model the user inserts the high-level attributes (e.g. color configuration of the painter). A strong relationship between the model of the virtual equipment and the models of the real nozzle machines can be described by FIG. 4.

For example, the user is able to model the constraints among the virtual equipment variables and the real machine variable (e.g. the painter equipment color is set to GREEN value only if the four nozzle machines are properly configured to mix up their basic colors in order to compose the GREEN color). Moreover, the applied composition pattern allows the system to detect that a machine is used and configured by a planning activity that reserves and sets values for the high-level equipment model. For instance, the planning activities of the MES application state that the paint equipment is reserved by a painting phase starting at time $t_s$, ending at a time $t_e$ and requiring the configuration of the color GREEN. By taking this planning decision at the high-level model, the system is also aware that two nozzle machines are busy from time $t_s$ to time $t_e$ and they are individually configured by their low-level machine attributes for composing the color GREEN (e.g. CYAN and YELLOW are busy and set to 100; MAGENTA and BLACK nozzles are idle).

Figure 5:
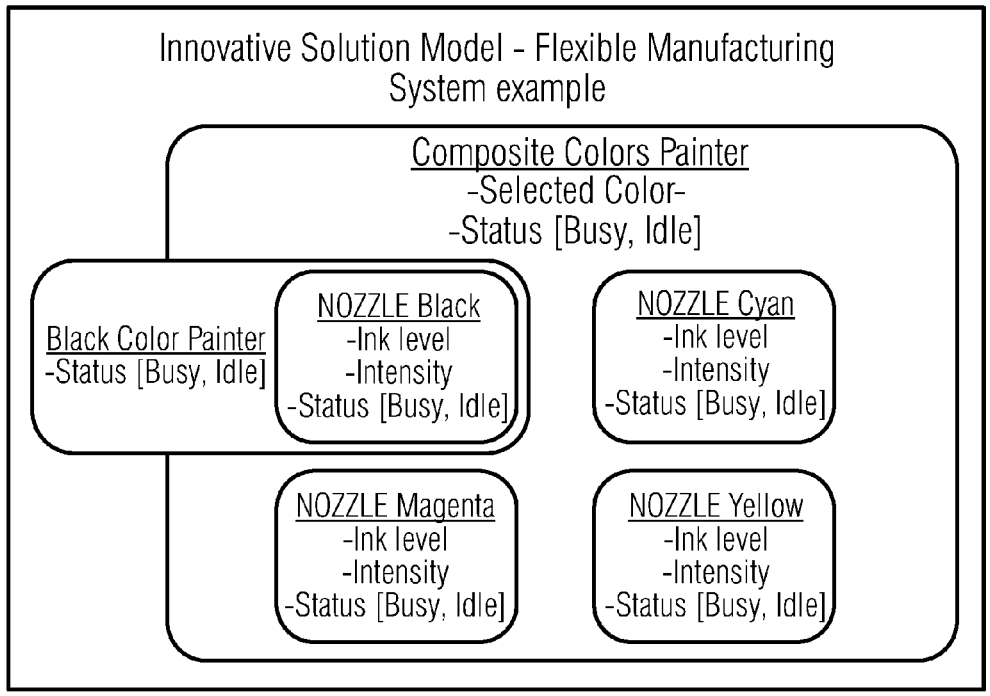
FIG. 5 is a diagram of the innovative solution model for a flexible manufacturing system.

As shown in FIG. 5 this approach now also allows modeling multiple different ways of using the nozzle machines as depicted in the example according to the FIGS. 2 and 3. If the machine can be used jointly for painting composed colors or individually for painting basic colors, the user can model a number of virtual equipment (e.g. one for each individual color and one for the composed colors as shown in FIG. 5). Whenever virtual equipment usage is planned, the system can easily detect if unfeasibility situations arise due to the constraints given in the planning level model. For instance, it is not possible to plan simultaneous usage of the composite color painter with the BLACK painter, because both rely on the real machine BLACK nozzle 10. However, it is possible to plan simultaneous usage of the BLACK painter machine and the CYAN painter machine because they rely on different machines.

This solution therefore allows one to develop an advanced plant modeling capability of the MES with an outstanding degree of adaptability to various industrial scenarios and flexible manufacturing systems. This ability significantly reduces efforts in the plant modeling phase for every MES application deployment. Moreover, it allows developing rich features of MES software that close the information management gaps between the different ISA95 modeling levels.

The invention claimed is:

1. A method for modeling a manufacturing process planned by enterprise resource planning (ERP) and produced by a shop floor, a manufacturing executing system (MES) implements a modeled manufacturing process and at least one of plans and controls corresponding manufacturing at the shop floor, the method comprises the steps of:
   providing a number of real machines at the shop floor and describing each real machine by a real machine module having machine attributes for controlling an execution of the real machine;
   defining within the manufacturing process a specific manufacturing activity requiring execution of a distinct subset of the real machines for performing a specific production activity;
   defining virtual equipment by combining the real machines contained in the distinct subset and describing the virtual equipment by a virtual equipment model to plan and control the specific production activity, the virtual equipment model having a planning level model and a controlling level model;
   assigning to the planning level model: a) high-level production attributes of the virtual equipment and b) possible constraints among the high-level production attributes; and
   assigning to the controlling level model the machine attributes of the real machine module.

2. The method according to claim 1, which further comprises the steps of:
   planning the manufacturing process using the planning level model of the virtual equipment model; and
   controlling the manufacturing process using the controlling level model of the virtual equipment model.

3. A system for modeling a manufacturing process planned by enterprise resource planning (ERP) and produced by a shop floor, and a manufacturing executing system (MES) implementing a modeled manufacturing process and at least one of plans and controls a corresponding manufacturing at the shop floor, the system comprising:
   a number of real machines at the shop floor, each of said real machines being described by a real machine module having machine attributes for controlling an execution of a real machine;
   means for defining within the manufacturing process a specific manufacturing activity requiring execution of a distinct subset of said real machines for performing a specific production activity;
   means for defining virtual equipment by combining said real machines contained in said distinct subset and describing said virtual equipment by a virtual equipment model to plan and control the specific production activity, said virtual equipment model having a planning level model and a controlling level model;
   means for assigning to said planning level model: a) high-level production attributes of said virtual equipment and b) possible constraints among said high-level production attributes; and
   means for assigning to said controlling level model the machine attributes of said real machine module.

4. The system according to claim 3, further comprising:
   means for planning the manufacturing process using said planning level model of said virtual equipment model; and
   means for controlling the manufacturing process using said controlling level model of said virtual equipment model.

* * * * *